(12) United States Patent
Manneschi

(10) Patent No.: US 11,867,864 B2
(45) Date of Patent: Jan. 9, 2024

(54) OPEN METAL DETECTOR

(71) Applicant: Alessandro Manneschi, Arezzo (IT)

(72) Inventor: Alessandro Manneschi, Arezzo (IT)

( * ) Notice: Subject to any disclaimer, the term of this patent is extended or adjusted under 35 U.S.C. 154(b) by 259 days.

(21) Appl. No.: 17/620,370

(22) PCT Filed: Jun. 22, 2020

(86) PCT No.: PCT/EP2020/067338
§ 371 (c)(1),
(2) Date: Dec. 17, 2021

(87) PCT Pub. No.: WO2020/254686
PCT Pub. Date: Dec. 24, 2020

(65) Prior Publication Data
US 2022/0236442 A1    Jul. 28, 2022

(30) Foreign Application Priority Data
Jun. 20, 2019   (FR) ..................... 1906685

(51) Int. Cl.
*G01V 3/10* (2006.01)

(52) U.S. Cl.
CPC ............... *G01V 3/104* (2013.01); *G01V 3/10* (2013.01)

(58) Field of Classification Search
CPC .......... G01V 3/10; G01V 3/104; G01V 3/107; G01V 3/108
See application file for complete search history.

(56) References Cited

U.S. PATENT DOCUMENTS

| | | | |
|---|---|---|---|
| 4,309,697 A | 1/1982 | Weaver | |
| 4,613,815 A | 9/1986 | Christel, Jr. | |
| 6,133,829 A | 10/2000 | Johnstone et al. | |
| 7,592,907 B2 * | 9/2009 | Manneschi | G01V 3/104 109/6 |
| 7,889,076 B2 * | 2/2011 | Manneschi | G01V 3/104 340/561 |
| 2007/0290843 A1 | 12/2007 | Manneschi | |
| 2013/0069620 A1 | 3/2013 | McAdam | |
| 2018/0372904 A1 * | 12/2018 | Moreland | G01V 3/02 |

FOREIGN PATENT DOCUMENTS

| | | |
|---|---|---|
| EP | 1750147 A1 | 2/2007 |
| EP | 1892542 A2 | 2/2008 |
| FR | 2545218 A1 | 11/1984 |

OTHER PUBLICATIONS

International Search Report for Application No. PCT/EP2020/067338 dated Sep. 10, 2020, 2 pages.
French Preliminary Search Report for FR Application No. 1906685 dated May 15, 2020, 2 pgs.

* cited by examiner

*Primary Examiner* — Steven L Yeninas
(74) *Attorney, Agent, or Firm* — Lerner David LLP

(57) ABSTRACT

A continuous wave system continuous wave system for detecting metal objects, comprising a transmitter assembly comprising transmitter coils (Tx1, . . . , Txm) and a first clock, a receiver assembly comprising receiver coils (Rx1, . . . , Rxn) housed in a second separate column and a second clock, a detector configured to detect an instant of zero crossing of all the electrical signals of the transmitter assembly and the receiver assembly, a signal generator configured to generate a phase realignment signal synchronized to said zero-crossing instant and a wireless communication interface configured to transmit the phase realignment signal so as to realign the phase of the first clock and the second clock.

14 Claims, 6 Drawing Sheets

OPEN METAL DETECTOR

CROSS-REFERENCE TO RELATED APPLICATIONS

The present application is a national phase entry under 35 U.S.C. § 371 of International Application No. PCT/EP2020/067338 filed Jun. 22, 2020, which claims priority from French Application No. 1906685 filed Jun. 20, 2019, all of which are incorporated herein by reference.

FIELD OF THE INVENTION

The present invention relates to the field of continuous wave detectors designed for the detection of unauthorized objects or materials in a protected access area.

STATE OF THE ART

It appears now necessary to monitor with great reliability the attempts to introduce certain products, for example but not exclusively weapons or explosive devices, into a sensitive area or the attempts to get them out of it.

The problem thus posed covers a very wide range of situations, which encompasses in particular and without limitation the attempt to introduce products into a protected area, such as a store, a school, a train station, a public or private organization, or the attempt to get products out of a defined perimeter, for example in case of theft in a company or on a protected site.

For many years, continuous wave walk-through detectors for detecting metallic objects have in particular been proposed, that is to say walk-through detectors using waves of constant amplitude and frequency in frequency ranges comprised between 70 Hz and 50 kHz typically, as opposed to the pulse detectors which work in the time domain and use "pulses" of magnetic field of approximately 100 µs to 500 µs and use the receiver to monitor the weakening of the magnetic field.

The general structure and the general operation of such continuous wave equipment are well known to those skilled in the art. Essentially, the walk-through detector comprises a transmitter assembly housed in a first column comprising transmitter coils which generate a magnetic field and a receiver assembly housed in a second column comprising receiver coils which detect disturbances of this field due to metallic objects carried by an individual passing through the walk-through detector. The first column and the second column are connected together by a cross member, which can carry complementary accessories such as a camera, a sound alarm and/or a visual alarm. Examples of such walk-through metal detectors will be in documents EP 1 750 147 and EP 1 892 542.

The transmitter and receiver coils are supplied and monitored by an electronic control unit. In order to allow the demodulation of the signal received by the receiver coils and to detect, with a reduced number of false alarms, metallic objects passing through the walk-through detector, the signals for driving the transmitter coils must have the same frequency and a phase coherent with the frequency and the phase of the demodulation signals of the receiver coils. This requirement is fulfilled by using a single clock to define the electrical signals transmitted to the transmitter coils and to demodulate the electrical signals transmitted by the receiver coils, and by connecting the control unit to both the transmitter assembly and the receiver assembly by wired means.

However, the current climate resulting from various attacks in public places has given rise to the need to be able to rapidly deploy checkpoints and security stations in order to allow detecting weapons at the entrance to public places, such as stadiums, concert halls, department stores, etc. Indeed, the surveillance of these public places requires a quick installation and withdrawal of the inspection equipment, insofar as the entrance to these public places also often serves as an emergency exit, so that all obstacles (including inspection equipment) must be able to be instantly withdrawn.

Yet, traditional walk-through detectors are not suitable for this type of situation insofar as their components must be assembled and disassembled systematically during their installation and their withdrawal. It is therefore necessary to bring and mount the two columns, the cross member as well as the control interface on the place of inspection, then to disassemble them, to put them in their storage box and then to remove them once the inspection is completed.

It has already been proposed to provide the pre-assembled walk-through detectors and to store them on adapted rolling trolleys in order to reduce the time for mounting the walk-through detectors. Such a solution is however not viable when the public place is large or when it does not have a suitable storage area for the trolleys and the pre-assembled walk-through detectors, which are very bulky.

DISCLOSURE OF THE INVENTION

One aim of the invention is to propose a continuous wave system for detecting metallic objects, which can be deployed and withdrawn quickly on a given area, while ensuring effective detection of the metallic objects with a reduced number of false alarms.

To this end, it is proposed, according to a first aspect of the invention, a continuous wave system for detecting metallic objects, comprising a transmitter assembly and a receiver assembly, in which:
  the transmitter assembly comprises at least one transmitter coil housed in a first column, a first clock configured to emit a first electrical signal at a first given frequency, at least one first frequency generator configured to transmit to a corresponding transmitter coil an electrical signal having a frequency which is synchronized to the first frequency such that the transmitter coil emits a magnetic field,
  the receiver assembly comprises:
  at least one receiver coil housed in a second column, distinct from the first column, said receiver coil being configured to produce an electrical signal as a function of the magnetic field emitted by the transmitter coil, a second clock configured to emit a second signal at a second given frequency, and at least one second frequency generator configured to determine an electrical signal having a frequency which is synchronized to the second frequency, and
  a unit for comparing the electrical signal produced by the receiver coil with the electrical signal determined by the second frequency generator.
The system further comprises:
  a detector configured to detect an instant of zero crossing of the set of the electrical signals transmitted by the at least one first frequency generator or the at least one second frequency generator,
  a signal generator configured to generate a phase realignment signal synchronized to the zero crossing instant detected by the detector and transmission means comprising a wireless communication interface configured to transmit to the transmitter assembly or to the receiver assembly the phase realignment signal in order to realign the phase of the first clock and of the second clock.

Some preferred but non-limiting characteristics of the continuous wave detection system described above are as follows, taken individually or in combination:
- the second given frequency is substantially equal to the first given frequency.
- the first clock is placed in the first column and the second clock is placed in the second column.
- the first clock and the second clock are displaced outside the first column and the second column.
- the detector is configured to detect an instant of zero crossing of the set of the electrical signals transmitted by the first frequency generator or the second frequency generator when said signals have a positive slope.
- the first column is separated from the second column so that the detection system has no physical connection between the first column and the second column.
- the transmitter assembly comprises at least two transmitter coils and as many associated first frequency generators, the receiver assembly comprises at least two receiver coils and as many associated second frequency generators.
- the wireless communication interface comprises the at least one of the following elements: a radiofrequency interface, an optical interface and/or an inductive interface. And/or
- the wireless communication interface comprises an inductive interface, said inductive interface comprising the at least one of the transmitter coils and of the receiver coils of the transmitter assembly and of the receiver assembly, respectively.

According to a second aspect, the invention proposes a method for detecting metallic objects with a continuous wave detection system as described above, said method comprising the following steps:
- S1: emitting a magnetic field at least at one transmitter coil from a corresponding electrical signal having a frequency which is a function of the first frequency of the first clock
- S2: producing at least at one receiver coil at least one electrical signal as a function of the magnetic field emitted in step
- S3: determining an electrical signal having a frequency which is a function of the second frequency of the second clock
- S4: comparing the electrical signal produced in step S2 and the electrical signal determined in step S3
- S5: detecting an instant of zero crossing of the set of the electrical signals whose frequency is a function of the first frequency or of the set of the electrical signals whose frequency is a function of the second frequency
- S6: generating a phase realignment signal synchronized to the zero crossing instant detected in step S5 and
- S7: transmitting using a wireless communication interface the phase realignment signal of the first clock and of the second clock to the transmitter assembly or to the receiver assembly.

Some preferred but non-limiting characteristics of the method are as follows, taken individually or in combination:
- the steps S2 and S3 are simultaneous.
- during step S5, the zero crossing instant is detected when the set of the electrical signals whose frequency is a function of the first frequency or the set of the electrical signals whose frequency is a function of the second frequency has a positive slope.
- during step S6, the phase realignment signal is generated at the transmitter assembly and transmitted to the receiver assembly, so as to realign the phase of the second clock with that of the first clock. And/or
- during step S6, the phase realignment signal is generated at the receiver assembly and transmitted to the transmitter assembly, so as to realign the phase of the first clock with that of the second clock.

DESCRIPTION OF THE FIGURES

Other characteristics, aims and advantages of the invention will emerge from the following description, which is purely illustrative and not limiting, and which should be read in relation to the appended drawings in which.

In all of the figures, similar elements bear identical references.

DETAILED DESCRIPTION OF THE INVENTION

Figure 1:
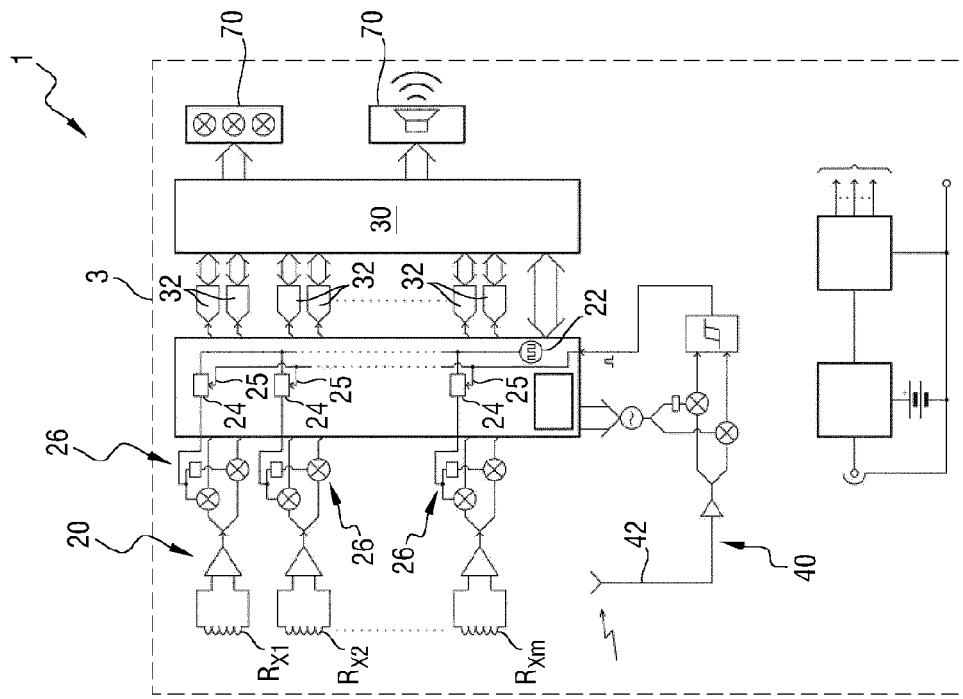
FIG. 1 schematically illustrates a detection system in accordance with a first embodiment of the invention.
Figure 1:
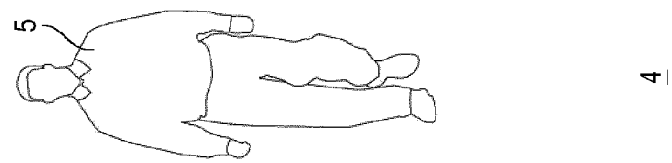
Figure 1:
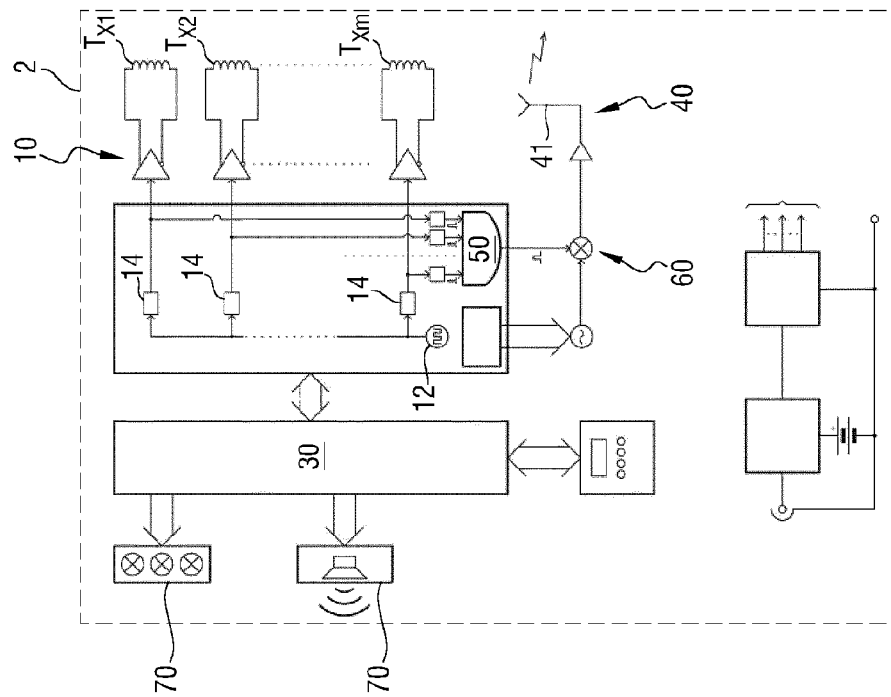

The appended figures, in particular in FIG. 1, represent a continuous wave detection system in accordance with the present invention comprising two columns 2, 3 defining therebetween a channel 4 through which individuals 5 to be checked can pass. As a non-limiting example, the height of the columns 2, 3 can be comprised between 150 cm and 200 cm, advantageously between 150 cm and 180 cm and the deviation between the two columns 2, 3 is advantageously comprised between 70 cm and 100 cm.

By column 2, 3, it is understood here any base, whatever its shape, capable of housing the detection means and of defining the passage channel for the individuals 5 to be checked. The column may thus have the shape of a substantially cylindrical or tubular post, of substantially planar panels or delimiting an ogive-shaped or elliptical space, etc.

The detection system 1 comprises a transmitter assembly 10, a receiver assembly 20 and analysis means 30. The transmitter assembly 10 comprises at least one transmitter coil Tx1, . . . , Txm housed in a first column 2 and configured to emit a magnetic field. The receiver assembly 20 comprises at least one receiver coil Rx1, . . . , Rxn housed in a second column 3, distinct from the first column 2, which is configured to detect disturbances of the magnetic field due to metallic objects. Finally, the analysis means 30 are suitable for analyzing the signals derived from the receiver coils to detect the presence of metallic objects carried by an individual 5 passing through said channel formed between the two columns 2, 3.

The transmitter Tx1, . . . , Txm and receiver Rx1, . . . , Rxn coils preferably cover the entire height of the columns 2, 3. They can be the object of numerous known embodiments, as used today in conventional walk-through metal detectors. Their operation in itself is also conventional. The structure and the operation of the transmitter Tx1, . . . , Txm and receiver Rx1, . . . , Rxn coils will therefore not be described in detail below. It will however be noted that preferably each transmitter Tx1, . . . , Txm or receiver Rx1, . . . , Rxn coil can be formed by several separate windings whose relative distribution over the height of the columns 2, 3 is adapted to optimize detection and is driven by the analysis means 30 to emit alternating inductive fields over a frequency range and receive all of these alternating inductive fields over said frequency range, respectively.

Preferably, the metal detector inductive fields generated by the transmitter Tx1, . . . , Txm and receiver Rx1, . . . , Rxn coils are in the frequency range comprised between 70 Hz and 50 kHz, preferably between 100 Hz and 50 kHz.

In order to quickly deploy and withdraw the system 1 in a given checkpoint, the first column 2 and the second column 3 of the system 1 are distinct and separate, i.e. they are no longer physically connected to each other by a cross member or by electric cables, and the signals of the transmitter assembly 10 and of the receiver assembly 20 are realigned in phase by wireless transmission means 40.

For that, the transmitter assembly 10 further comprises a first clock 12 configured to transmit a first electrical signal at a first given frequency F1 and at least one first frequency generator 14 configured to transmit to a corresponding transmitter coil Tx1, . . . , Txm an electrical signal having a frequency which is synchronized to the first frequency F1 so that the transmitter coil Tx1, . . . , Txm emits a magnetic field.

Furthermore, the receiver assembly 20 comprises a second clock 22 configured to emit a second signal at a second given frequency F2 substantially equal to the first given frequency F1, and at least one second frequency generator 24 configured to determine an electrical signal having a frequency which is synchronized to the second frequency F2, as well as a unit for comparing the electrical signal produced by the receiver coil Rx1, . . . , Rxn with the electrical signal determined by the second frequency generator 24.

Finally, the system 1 also comprises:
- a detector 50 configured to detect an instant of zero crossing of the set of the electrical signals transmitted by the first frequency generator 14 or the second frequency generator 24,
- a signal generator 60 configured to generate a phase realignment signal synchronized to the zero crossing instant detected by the detector 50 and
- the wireless transmission means 40, which are configured to transmit to the transmitter assembly 10 or to the receiver assembly 20 the phase realignment signal in order to realign the phase of the first clock 12 and of the second clock 22.

It will be understood that the first clock 12 and the second clock 22 are not necessarily housed in the first column 2 and the second column 3 but can be fixed outside these columns 2, 3 or, as a variant, distant from said columns 2, 3 and connected, by wired or wireless means, to the corresponding frequency generators and to the wireless transmission means 40.

In the following, the invention will be described for the sake of simplicity in the case where the first clock 12 and the second clock 22 are housed in the first column 2 and in the second column 3, respectively. Furthermore, the invention will be described in the case where the first and the second frequency generator 14, 24 comprise frequency dividers. This is however not limiting, any programmable logic device capable of generating synchronized frequencies starting from the same clock 12, 22 can be used.

The first clock 12 and the second clock 22 emit electrical signals at a first and a second frequency F1, F2, respectively. In one embodiment, the first frequency F1 is substantially identical to the second frequency F2. It will however be noted that the frequency of the clocks 14, 24 being generally based on the mechanical resonance of a quartz, the first and the second frequency F1, F2 are necessarily slightly different due to the bias induced by the quartz oscillations. This also explains the need to realign the phase of the first clock 12 and of the second clock 22 in order to allow the demodulation of the signals received by the receiver coils Rx1, . . . , Rxn.

The Transmitter Assembly 10

The transmitter assembly 10, which is housed in the first column 2 of the system 1, comprises at least one transmitter coil Tx1, . . . , Txm. Preferably, the transmitter assembly 10 comprises several transmitter coils Tx1, . . . , Txm, for example between four and ten.

Each transmitter coil Tx1, . . . , Txm is configured to receive an electrical signal and emit a magnetic field which depends on the frequency of the received electrical signal. Preferably, the frequencies of the electrical signals transmitted to the transmitter coils Tx1, . . . , Txm are all different, while remaining a sub-multiple of the first frequency F1 of the first clock 12. For that, the first clock 12 is connected to a set of first frequency dividers 14 which are each connected to an associated transmitter coil Tx1, . . . , Txm and are each associated with a different division setpoint N1, . . . Nm.

By way of non-limiting example, the frequency Fi of the electrical signal received by a given transmitter coil Txi (i comprised between 1 and m) is equal to the quotient of the frequency of the first clock 12 and of a predefined division setpoint Ni, where the division setpoint Ni varies from one frequency divider 14 to another. Preferably, the frequencies Fi generated by the first frequency dividers 14 are different from each other ($Ni \neq Nj$ $\forall(i, j) \in [1; m]$)

Furthermore, each transmitter coil Txi can be excited by at least one of these frequencies Fi ($i \in [1; m]$))

The Receiver Assembly 20

The receiver assembly 20, which is housed in the second column 3 of the system 1, comprises at least one receiver coil Rx1, . . . , Rxn. Preferably, the receiver assembly 20 comprises several receiver coils Rx1, . . . , Rxn, for example between four and ten. The receiver assembly 20 can comprise as many receiver coils Rx1, . . . , Rxn as the transmitter assembly 10 comprises transmitter coils Tx1, . . . , Txm, or a different number ($m \neq n$).

Each receiver coil Rx1, . . . , Rxn is configured to detect disturbances of the magnetic field due to metallic objects and generate an electric signal whose frequency depends on the detected magnetic field.

The second clock 22 emits a second electrical signal having the second given frequency F2. This electrical signal is transmitted to the second frequency dividers 24, which generate as output an electrical signal whose frequency is a sub-multiple of the second frequency F2.

The frequencies thus obtained by the second frequency dividers 24 are transmitted, for each receiver coil Rx1, . . . , Rxn and each second frequency divider 24, to an associated comparison unit 26 which aims to demodulate the electrical signal generated by the receiver coil Rx1, . . . , Rxn. For this purpose, the comparison unit 26 compares, for each receiver coil Rx1, . . . , Rxn, the electrical signal produced by this receiver coil Rx1, . . . , Rxn with the electrical signal determined by the second frequency divider 24. This information is then communicated to the analysis means 30 which deduce therefrom whether the magnetic field generated by the transmitter assembly 10 has been disturbed by metallic objects.

For example, the comparison unit 26 can comprise a subtraction unit which is configured to differentiate between the electrical signal produced by the receiver coil Rx1, . . . , Rxn and the electrical signal determined by the second frequency divider 24.

In the exemplary embodiment illustrated in the figures, the comparison unit 26 comprises a mixer associated with each coil Rx1, . . . , Rxn configured to determine the in-phase (In-phase, I) and quadrature (Q) component of the electrical signal by mixing the electrical signal produced by the receiver coil Rx1, . . . , Rxn and the electrical signal determined by the second frequency divider 24, this mixing being made by applying on the one hand a reference phase and on the other hand a phase shift of $\pi/2$ to the electrical signal generated by the associated second frequency divider 24. These components are then sent to an analog-to-digital converter 32 which converts them into digital data and then communicates them to the analysis means 30.

It will be noted that, analogously to the transmitter assembly 10, the frequencies generated by the second frequency dividers 24 correspond to those generated by the first frequency dividers 14, and that each coil Rx1, . . . , Rxn can be demodulated by one or several of these frequencies.

The Detector 50

Figure 3:
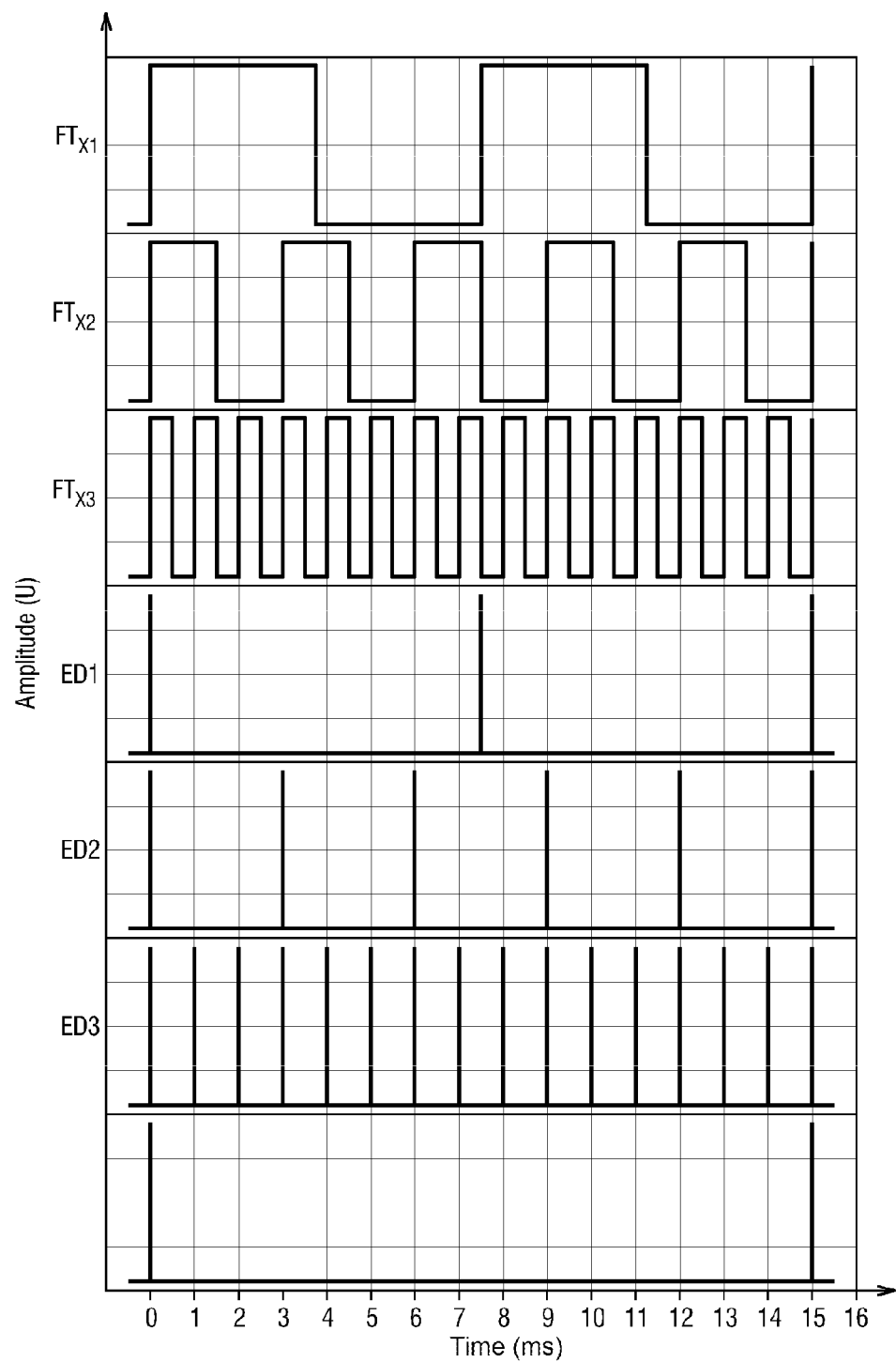
FIG. 3 illustrates the frequency of the electrical signal transmitted to three transmitter coils, the corresponding pulses received as input of the detector and the pulses generated by the corresponding signal generator of an exemplary embodiment of a detection system in accordance with the invention.
Figure 4:
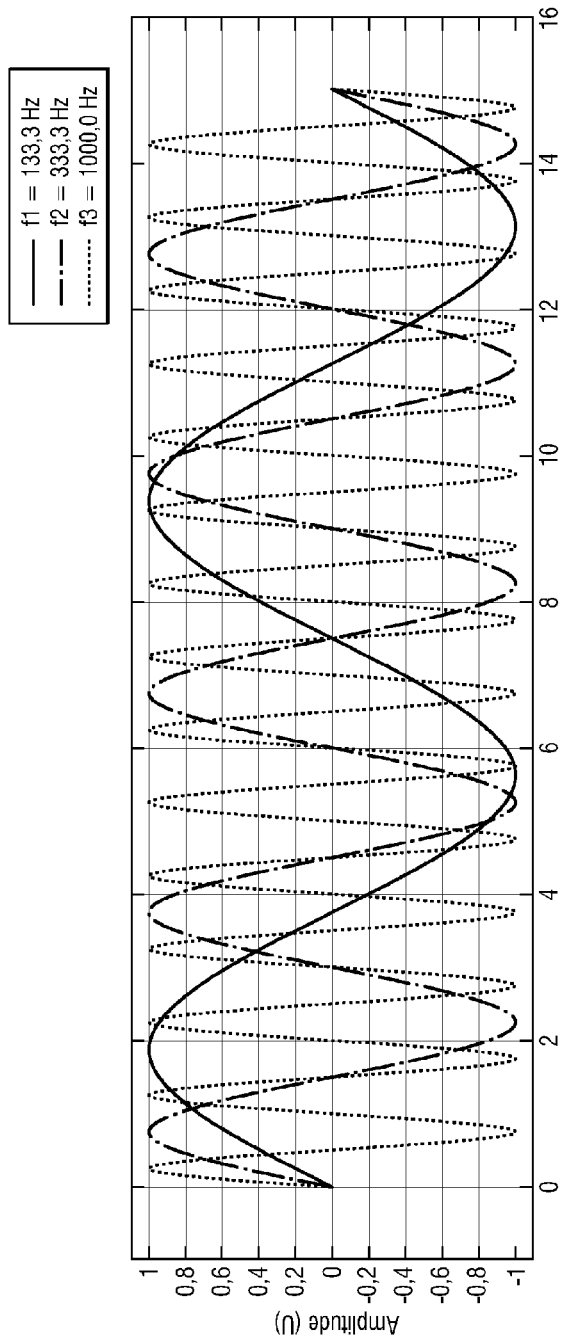
FIG. 4 illustrates the sinusoidal frequencies of the three electrical signals of FIG. 3, as well as the instant of zero crossing with a positive slope for these three electrical signals.

The detector 50 is configured to detect an instant of zero crossing of the set of the electrical signals transmitted by the first frequency divider 14 or the second frequency divider 24 (see FIGS. 3 and 4).

Figure 2:
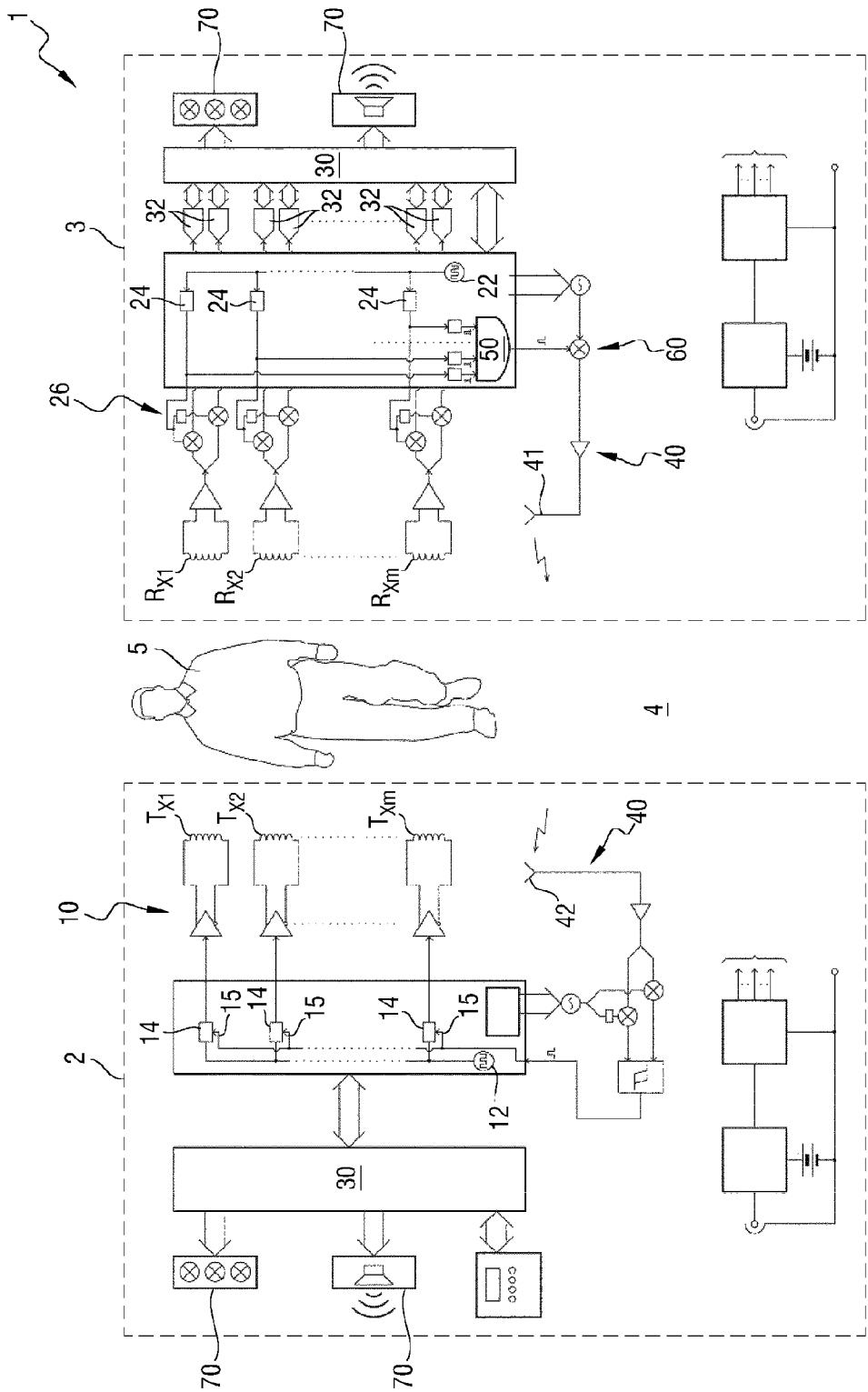
FIG. 2 schematically illustrates a detection system in accordance with a second embodiment of the invention.

In the exemplary embodiment illustrated in FIG. 1, the phase of the second clock 22 is realigned with the phase of the first clock 12. The detector 50 therefore receives of the set of the electrical signals transmitted by the first frequency divider(s) 14 and determines the instant of zero crossing of these electrical signals. As a variant, in FIG. 2, the phase of the first clock 12 is realigned with the phase of the second clock 22. The detector 50 therefore receives the set of the electrical signals transmitted by the second frequency divider(s) 24 and determines the instant of zero crossing of these electrical signals.

Insofar as the electrical signals are sinusoidal (FIG. 4), each electrical signal successively takes the zero value with a positive slope and a negative slope. In other words, the value of the signal can for example start from zero, then increase (positive slope) until reaching a local maxima, then decrease until reaching a local minima (negative slope) through zero. It follows that, on the set of the electrical signals, there are several instants of zero crossing of the set of the electrical signals, where some of these signals have a negative slope while others have a positive slope. In order to realign the phase of the electrical signal of the second clock 22 with the phase of the electrical signal of the first clock 12, the detector 50 is configured to detect the instant of zero crossing of the set of the electrical signals transmitted by the first or the second frequency divider 14, 24 when these signals all have a positive slope. As a variant, it will of course be understood that the detector 50 can also be configured to detect the instant of zero crossing of these signals when they all have a negative slope.

The Signal Generator 60

Once this instant is detected, the signal generator 60 generates the phase realignment signal. This signal is synchronized to the zero crossing instant detected by the detector 50.

The phase realignment signal can in particular comprise a pulse (FIG. 3).

The signal generator 60 and the detector 50 are preferably housed in the column 2, 3 housing the frequency dividers 14, 24 whose detector 50 determines the zero crossing instant.

The Transmission Means 40

The transmission means 40 comprise communication interfaces 41, 42 configured to transmit to a communication interface of the transmitter assembly 10 or of the receiver assembly 20 the phase realignment signal in order to realign the phase of the first clock 12 and of the second clock 22. The communication interfaces 41, 42 are connected either to the signal generator 60 (when the communication interface 41 is configured to transmit the phase realignment signal) or to the frequency dividers 14, 24 (when the communication interface 42 is configured to receive the phase realignment signal). The communication interfaces 41, 42 comprise a wireless interface in order to allow easily and rapidly placing the detection system 1, for example an interface of the radiofrequency, Wi-Fi, Bluetooth type, by optical (typically infrared using photodiodes for example) or inductive communication, etc. It will be noted that, in the case of optical communication, the Applicant has noticed that the possible temporary masking of the infrared wireless interfaces would not be detrimental to the operation of the system insofar as the clocks 12, 22 remain very accurate and can realign with the next phase realignment signal. Where appropriate, when the communication interfaces comprise an inductive interface, said inductive interface can optionally comprise the at least one of the transmitter coils Tx1, . . . , Txm and of the receiver coils Rx1, . . . , Rxn of the transmitter assembly 10 and of the receiver assembly 20, respectively. In other words, the inductive interface can use all or part of the transmitter Tx1, . . . , Txm and receiver Rx1, . . . , Rxn coils of the detection system 1 for transmitting and receiving the phase realignment signal in order to realign the phase of the first clock 12 and of the second clock 22.

For example, the communication interfaces 41, 42 of the transmission means 40 comprise a modulator 41 configured to modulate a carrier signal with the phase realignment signal of the generator in order to communicate it, for example by radiofrequencies, to the transmitter assembly 10 or to the receiver assembly 20, and a demodulator 42 configured to demodulate the carrier signal and extract the phase realignment signal and then transmit it to the receiver assembly 20 or to the transmitter assembly 10, respectively.

This realignment signal is then communicated by the demodulator 42 to the set of the frequency dividers 14, 24 which is driven by the clock 12, 22 whose phase must be realigned. Typically, in the exemplary embodiment illustrated in FIG. 1, the realignment signal is transmitted to the set of the second frequency dividers 24. More specifically, the realignment signal is transmitted to the reset input of the second frequency dividers 24 in order to realign them in phase and thus ensure the phase coherence in the detection system 1.

The Analysis Means 30

As indicated previously, the comparison unit 26 associated with each receiver coil Rx1, . . . , Rxn sends to the analysis means 30 information on the electrical signal generated by the corresponding receiver coil Rx1, ..., Rxn and demodulated using the electrical signal determined by the second frequency divider 24. The analysis means 30 then deduce therefrom whether the magnetic field generated by the transmitter assembly 10 has been disturbed by metallic objects.

When the analysis means 30 determine that the magnetic field has been disturbed by one or several metallic object(s), the analysis means 30 send instructions for generating an alarm (sound and/or optical alarm) to one or several transmitters 70 (speaker, LED (Light-Emitting Diode), flashing lamp, etc.). The transmitters 70 can be housed in the second column 3 and/or in the first column 2. When the alarm transmitters 70 are housed in whole or in part in the first column 2, the alarm generation instructions are communicated to the transmitters 70 of the first column 2 via the transmission means 40 (see FIG. 3).

The analysis means 30 can in particular comprise a processor, microprocessor, microcontroller, etc. type computer configured to execute instructions.

It will be noted that the communication interfaces 41, 42 of the transmission means 40 can, where appropriate, further be configured to transmit and receive diagnostic signals, or to allow the detection system 1 to communicate with another detection system 1 comprising, analogously, a transmitter assembly 10, a receiver assembly 20, a detector 50, a signal generator 60 and transmission means 40. Where appropriate, the settings of the detection systems 1 can then be synchronized, thanks to their communication interface 41, 42, by wireless means. For example, the transmitter assembly 10 of a first detection system 1 can transmit the synchronization information to the transmitter assembly 10 of a second detection system 1, via their respective communication interface 41, 42.

Figure 5:
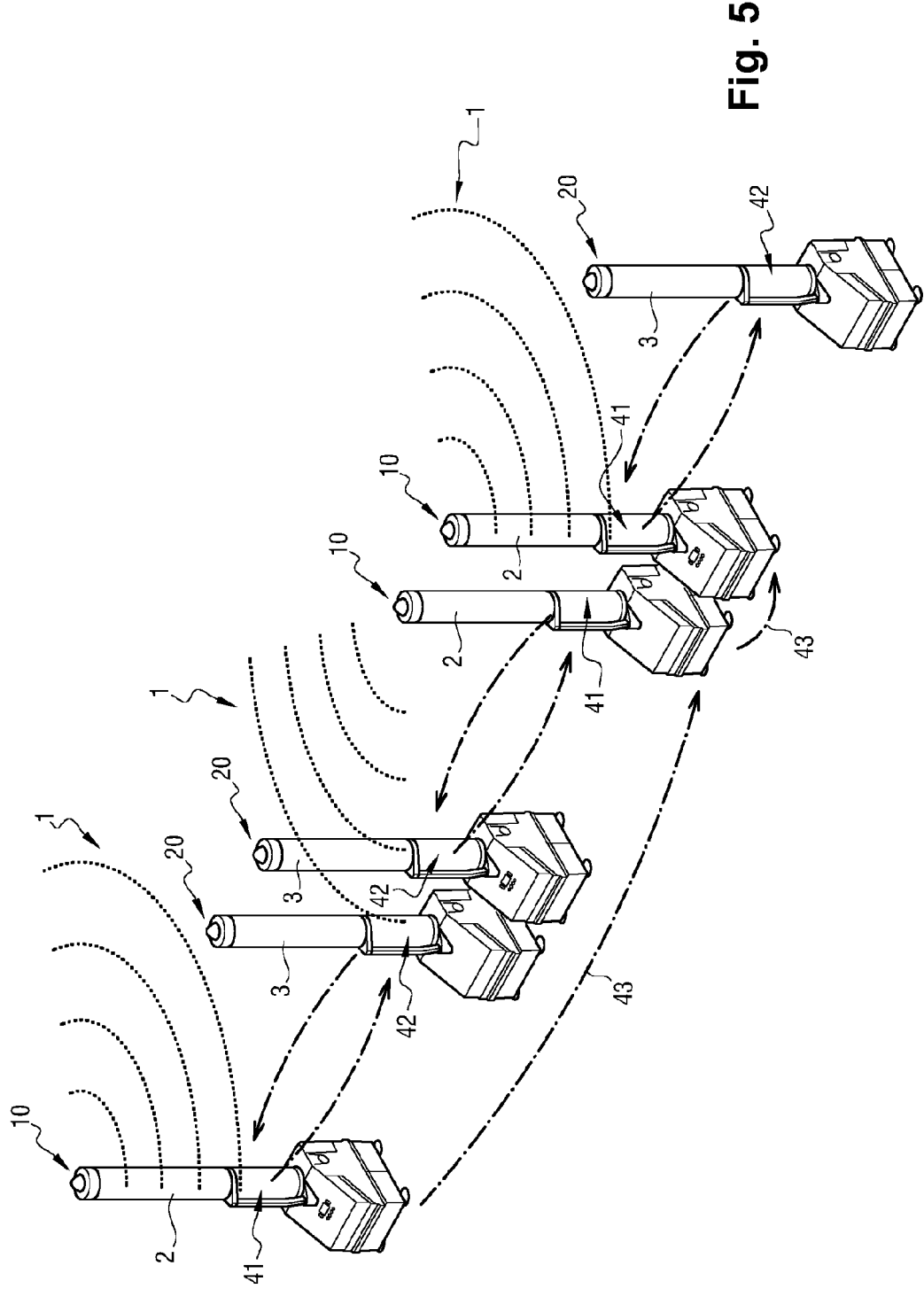
FIG. 5 illustrates one example of a detection assembly comprising three detection systems in accordance with the invention.
Figure 6:
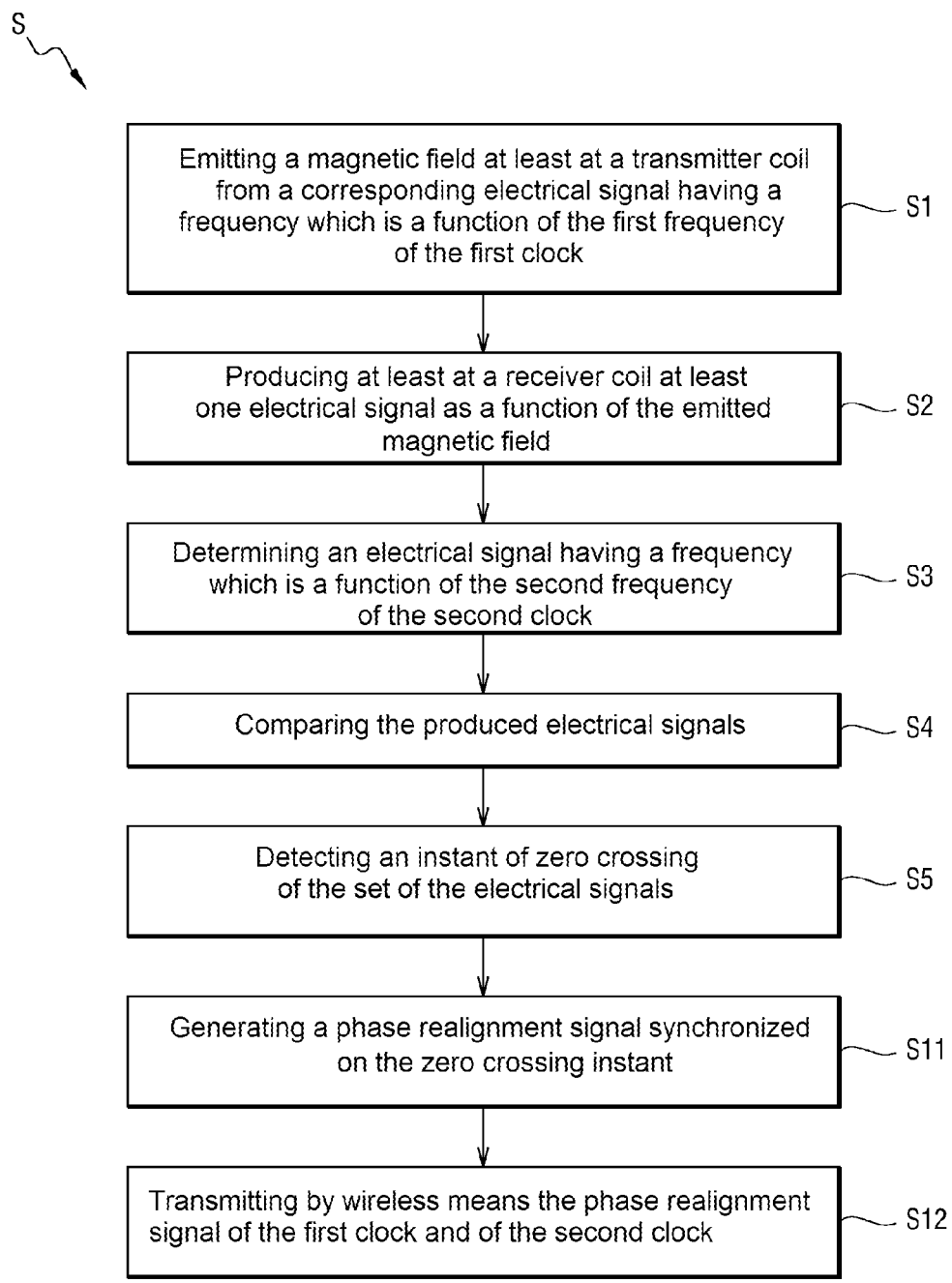
FIG. 6 is a flowchart of steps of a detection method according to one embodiment of the invention.

Thus, FIG. 5 illustrates a detection assembly comprising three detection systems 1 in accordance with the invention. Each detection system 1 comprises a transmitter assembly 10 and a receiver assembly 20 each comprising a communication interface 41, 42 in order to send and receive, respectively, the phase realignment signal from their respective clocks 12, 22. Furthermore, the transmitter assembly 10 of each detection system 1 transmits, via its communication interface 41, 42, synchronization information to the transmitter assembly of the adjacent detection system (communication channel 43).

The Detection Method S

The detection of metallic objects using a continuous wave detection system 1 can in particular be made in accordance with the following steps. In what follows, the invention will be described in the case where the transmitter assembly 10 comprises several transmitter coils Tx1, ..., Txm and the receiver assembly 20 comprises several receiver coils Rx1, ..., Rxn. As seen above, however, this is not limiting.

During a first step S1, the transmitter coils Tx1, ..., Txm emit a magnetic field from an electrical signal having a frequency which is a function of the first frequency F1 of the first clock 12.

For that, the first clock 12 sends a first electrical signal having the first given frequency F1 to the first frequency dividers 14. Each first frequency divider 14 then divides the first frequency F1 by its associated division setpoint $N_1, \ldots, N_m$. For each transmitter coil Tx1, ..., Txm, an oscillator then produces an electrical signal having the frequency thus determined by the first associated frequency divider 14 and transmits it to the transmitter coil Tx1, ..., Txm in order to generate a magnetic field.

During a second step S2, the magnetic fields emitted in step S1 induce an electrical signal in each receiver coil Rx1, ..., Rxn.

During a third step S3, which is simultaneous with the second step S2, the second clock 22 sends a second electrical signal having the second given frequency F2 to the second frequency dividers 24. Each second frequency divider 24 then divides the second frequency F2 by its associated division setpoint $N_1, \ldots, N_m$. For each receiver coil Rx1, ..., Rxn, an oscillator therefore produces an electrical signal having the frequency thus determined by the associated second frequency divider 24.

During a fourth step S4, the electrical signal induced in each receiver coil Rx1, ..., Rxn is compared with the electrical signal determined by the associated second frequency divider 24.

For that, for each receiver coil Rx1, ..., Rxn, the comparison unit 26 receives as input the electrical signal induced in the receiver coil Rx1, ..., Rxn and the electrical signal determined by the second associated frequency divider 24. Then, the comparison unit 26 determines the in-phase (I) and quadrature (Q) components of the electrical signal.

The in-phase (I) and quadrature (Q) components of each electrical signal thus determined are then transmitted to an associated analog-to-digital converter 32, which converts them into digital data and then communicates them to the analysis means 30.

In a manner known per se, the analysis means 30 then deduce whether the magnetic field generated by the emitter assembly 10 has been disturbed by metallic objects.

During a fifth step S5, the detector 50 detects an instant of zero crossing of the set of the electrical signals whose frequency is a function of the first frequency F1 or of the set of the electrical signals whose frequency is a function of the second frequency F2.

When it is the phase of the second clock 22 that is realigned with the phase of the first clock 12 (FIG. 1), during the fifth step, the detector 50 detects the instant of zero crossing of the set of the electrical signals transmitted by the first frequency divider(s) 14. When it is the phase of the first clock 12 that is realigned with the phase of the second clock 22 (FIG. 2), during the fifth step S5, the detector 50 detects the instant of crossing to zero of the set of the electrical signals transmitted by the second frequency divider(s) 24.

In one embodiment, the zero crossing time is detected when the set of said electrical signals (transmitted by the first or second frequency dividers 14, 24) have a positive slope (i.e. when the value of the signal is negative immediately before the zero crossing and positive immediately after). As a variant, the zero crossing instant can be detected when the set of said electrical signals (transmitted by the first or second frequency dividers 10, 24) have a negative slope.

During a sixth step S6, a phase realignment signal which is synchronized to the zero crossing instant detected in step S5 is generated. This phase realignment signal is generated by the signal generator 60.

During a seventh step S7, the phase realignment signal is transmitted to the transmitter assembly 10 or to the transmitter assembly 10 to realign the phase of the first clock 12 and of the second clock 22.

For example, when the phase of the second clock 22 is realigned with the phase of the first clock 12 (FIG. 1), the phase realignment signal is generated at the transmitter assembly 10. This signal is therefore transmitted to the communication interface 41 of the transmitter assembly 10, which is then a modulator, so that it modulates the carrier signal with the phase realignment signal of the generator to communicate it to the communication interface 42 of the receiver assembly 20. This interface then comprises a demodulator 42 configured to demodulate the carrier signal thus received and extract the phase realignment signal. The signal thus demodulated is then transmitted to the reset input 25 of the set of second frequency dividers 24 in order to realign them in phase with the first clock 12 and thus to ensure the phase coherence in the detection system 1.

As a variant, when it is the phase of the first clock 12 that is realigned with the phase of the second clock 22 (FIG. 2), the phase realignment signal is generated at the receiver assembly 20. This signal is therefore transmitted to the communication interface 41 of the receiver assembly 20, which is then a modulator, which communicates it to the communication interface 42 of the transmitter assembly 10, analogously to what has been described previously. The signal thus demodulated is then transmitted to the reset input 15 of the set of the first frequency dividers 14 in order to realign them in phase with the second clock 22 and thus ensure the phase coherence in the detection system 1.

The invention claimed is:

1. A continuous wave system for detecting metallic objects, comprising
    a transmitter assembly and a receiver assembly;
        wherein the transmitter assembly comprises a transmitter coil housed in a first column, a first clock configured to emit a first electrical signal at a first frequency, a first frequency generator configured to transmit to a corresponding transmitter coil an electrical signal having a frequency which is synchronized to the first frequency such that the transmitter coil emits a magnetic field;
        wherein the receiver assembly comprises:
        a receiver coil housed in a second column, distinct from the first column, said receiver coil being configured to produce an electrical signal as a function of the magnetic field emitted by the transmitter coil, a second clock configured to emit a second signal at a given frequency, and a second frequency generator configured to determine an electrical signal having a frequency which is synchronized to the second frequency; and
        a unit for comparing the electrical signal produced by the receiver coil with the electrical signal determined by the second frequency generator;
        a detector configured to detect an instant of zero crossing of electrical signals transmitted by the first frequency generator or the second frequency generator;
        a signal generator configured to generate a phase realignment signal synchronized to the instant of zero crossing detected by the detector; and
        transmission means comprising a wireless communication interface configured to transmit to the transmitter assembly or to the receiver assembly the phase realignment signal in order to realign a phase of the first clock with a phase of the second clock.

2. The continuous wave system according to claim 1, wherein the given frequency is substantially equal to the first frequency.

3. The continuous wave system according to claim 1, wherein the first clock is placed in the first column and the second clock is placed in the second column.

4. The continuous wave system according to claim 1, wherein the first clock and the second clock are outside the first column and the second column.

5. The continuous wave system according to claim 1, wherein the detector is configured to detect the instant of zero crossing of the electrical signals transmitted by the first frequency generator or the second frequency generator when the electrical signals transmitted by the first frequency generator or the second frequency generator have a positive slope.

6. The continuous wave system according to claim 1, wherein the first column is separated and distinct from the second column so that the continuous wave system has no physical connection between the first column and the second column.

7. The continuous wave system according to claim 1, wherein the transmitter assembly comprises at least one additional transmitter coil and as many associated additional first frequency generators, the receiver assembly comprises at least one additional receiver coils and as many associated additional second frequency generators.

8. The continuous wave system according to claim 1, wherein the wireless communication interface comprises at least one of the following elements: a radiofrequency interface, an optical interface, an inductive interface.

9. The continuous wave system according to claim 8, wherein the wireless communication interface comprises an inductive interface, the inductive interface comprising at least one of the transmitter coil and the receiver coils.

10. A method for detecting metallic objects comprising the following steps:
    S1: emitting a magnetic field at a transmitter coil from a transmitter assembly from a corresponding electrical signal having a frequency which is a function of a first frequency of a first clock from the transmitter assembly;
    S2: producing a receiver coil from a receiver assembly an electrical signal as a function of the magnetic field emitted in step S1;
    S3: determining an electrical signal having a frequency which is a function of a second frequency of a second clock of the receiver assembly;
    S4: comparing the electrical signal produced in step S2 and the electrical signal determined in step S3;
    S5: detecting an instant of zero crossing of the electrical signals whose frequency is a function of the first frequency or of the electrical signals whose frequency is a function of the second frequency;
    S6: generating a phase realignment signal synchronized to the instant of zero crossing detected in step S5; and
    S7: wirelessly transmitting the phase realignment signal of the first clock and of the second clock to the transmitter assembly or to the receiver assembly;
    wherein the method for detecting metallic objects further comprises determining if the magnetic field emitted in step S1 has been disturbed by metallic objects.

11. The method for detecting metallic objects according to claim 10, wherein steps S2 and S3 are simultaneous.

12. The method for detecting metallic objects according to claim 10, wherein, during step S5, the instant of zero crossing is detected when the electrical signals whose frequency is a function of the first frequency or whose frequency is a function of the second frequency have a positive slope.

13. The method for detecting metallic objects according to claim 10, wherein, during step S6, the phase realignment signal is generated at the transmitter assembly and transmitted to the receiver assembly, so as to realign a phase of the second clock with a phase of the first clock.

14. The method for detecting metallic objects according to claim 10, wherein, during step S6, the phase realignment signal is generated at the receiver assembly and transmitted to the transmitter assembly, so as to realign a phase of the first clock with a phase of the second clock.

\* \* \* \* \*